United States Patent
Morris et al.

(10) Patent No.: US 6,771,451 B2
(45) Date of Patent: Aug. 3, 2004

(54) AUTO CENTERING OF DISKS ON A HARD DISK DRIVE

(75) Inventors: Frank Ivan Morris, San Jose, CA (US); Scott Tran, San Jose, CA (US); Joseph Chang, Milipitas, CA (US)

(73) Assignee: Samsung Electronics Co., Ltd. (KR)

(*) Notice: Subject to any disclaimer, the term of this patent is extended or adjusted under 35 U.S.C. 154(b) by 399 days.

(21) Appl. No.: 09/946,869

(22) Filed: Sep. 4, 2001

(65) Prior Publication Data

US 2003/0043493 A1 Mar. 6, 2003

(51) Int. Cl.⁷ .................. G11B 21/02; G11B 15/46
(52) U.S. Cl. .................. 360/75; 360/73.03
(58) Field of Search .................. 360/75, 99.08, 360/99.12, 270, 73.03; 73/469

(56) References Cited

U.S. PATENT DOCUMENTS

| | | | |
|---|---|---|---|
| 4,683,505 A | | 7/1987 | Schmidt et al. |
| 4,739,425 A | | 4/1988 | Dierkes et al. |
| 4,784,012 A | | 11/1988 | Marra |
| 4,819,105 A | | 4/1989 | Edwards |
| 4,933,927 A | * | 6/1990 | Ross .................. 369/270 |
| 5,016,131 A | | 5/1991 | Riggle et al. |
| 5,043,973 A | * | 8/1991 | Ocheltree et al. .......... 369/270 |
| 5,121,272 A | * | 6/1992 | Maekawa et al. ......... 360/99.08 |
| 5,130,870 A | | 7/1992 | Jabbari |
| 5,161,900 A | | 11/1992 | Bougathou et al. |
| 5,167,167 A | | 12/1992 | Tiernan, Jr. et al. |
| 5,172,282 A | | 12/1992 | Ghose |
| 5,202,803 A | | 4/1993 | Albrecht et al. |
| 5,233,493 A | | 8/1993 | Eliason |
| 5,422,776 A | | 6/1995 | Thorson et al. |
| 5,460,017 A | | 10/1995 | Taylor |
| 5,537,272 A | | 7/1996 | Kazmierczak et al. |
| 5,555,144 A | | 9/1996 | Wood et al. |
| 5,621,588 A | | 4/1997 | Williams et al. |
| 5,824,898 A | * | 10/1998 | Brooks et al. .................. 73/469 |
| 5,825,746 A | * | 10/1998 | Lee .................. 369/270 |
| 5,885,005 A | | 3/1999 | Nakano et al. |
| 5,903,540 A | | 5/1999 | Ro et al. |
| 6,158,112 A | * | 12/2000 | Kim et al. .................. 29/759 |
| 6,178,062 B1 | | 1/2001 | Yim et al. |
| 6,453,541 B1 | * | 9/2002 | Guthrie et al. .......... 29/603.03 |
| 6,600,628 B2 | * | 7/2003 | Kilmer .................. 360/99.12 |

* cited by examiner

Primary Examiner—David Hudspeth
Assistant Examiner—Jason Olson
(74) Attorney, Agent, or Firm—Irell & Manella LLP; Jeffrey P. Aiello

(57) ABSTRACT

A method for centering the disk of a disk stack assembly. The method includes the step of applying a torque to the disk stack and spinning the disks. Both the torque and the spinning speed are less than normal operating values. A series of radial forces may then be applied to the disk stack. The series of forces will cause the rotating disks to self center. The rotating disks are eventually spun down and a full torque is applied to the disk stack to secure the disks.

20 Claims, 2 Drawing Sheets

AUTO CENTERING OF DISKS ON A HARD DISK DRIVE

BACKGROUND OF THE INVENTION

1. Field of the Invention

The present invention relates to a spindle motor/disk assembly of a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor that is mounted to a base plate of the drive. Each disk has a center opening that slides over a hub of the spindle motor. To allow clearance between the disks and spindle motor the inner diameter of the center opening is larger than the outer diameter of the motor hub. The larger center disk opening creates a space between the disks and the hub. The space may allow the disk to be offset from the center of the spindle motor.

The disks typically contain servo information that is used to locate and maintain the heads on the centers of each track. The servo information is typically written onto the disk during the manufacturing process of the hard disk drive units. The servo information is sometimes written onto the disk with an "off-line" servo writer. Off-lines writers include a spindle motor that spins a disk stack assembly, a plurality of heads coupled to the disks of the assembly, and a servo writing circuit coupled to the heads to write servo information onto the disks.

The disks are stacked onto a chuck that is coupled to the spindle motor. The chuck may have a feature that centers the disk stack with the spindle motor. To provide clearance for the disks, the outer diameter of the chuck is smaller than the inner diameter of the disk. The difference in diameter may allow the disk to be off-center in the servo writer. Offset disks may result in non-concentric tracks on the disk. Non-concentric tracks may increase the seek and servo routines of the drive, thereby degrading the performance of the disk drive.

BRIEF SUMMARY OF THE INVENTION

A method for assembling a disk stack assembly that has at least one disk. The method includes initially applying a torque to the disk stack assembly that is less than an operating torque and then spinning the disk stack at a speed that is less than an operating speed of the disk. A force is applied to the disk stack while the disk is spinning. The disk is then spun down and the operating torque is applied to the disk stack assembly.

DETAILED DESCRIPTION

Disclosed is a method for centering the disk of a disk stack assembly. The method includes the step of applying a torque to the disk stack and spinning the disks. Both the torque and the spinning speed are less than normal operating values. A series of radial forces may then be applied to the disk stack. The series of forces will cause the rotating disks to self center. The rotating disks are eventually spun down and a full torque is applied to the disk stack to secure the disks.

Figure 1:
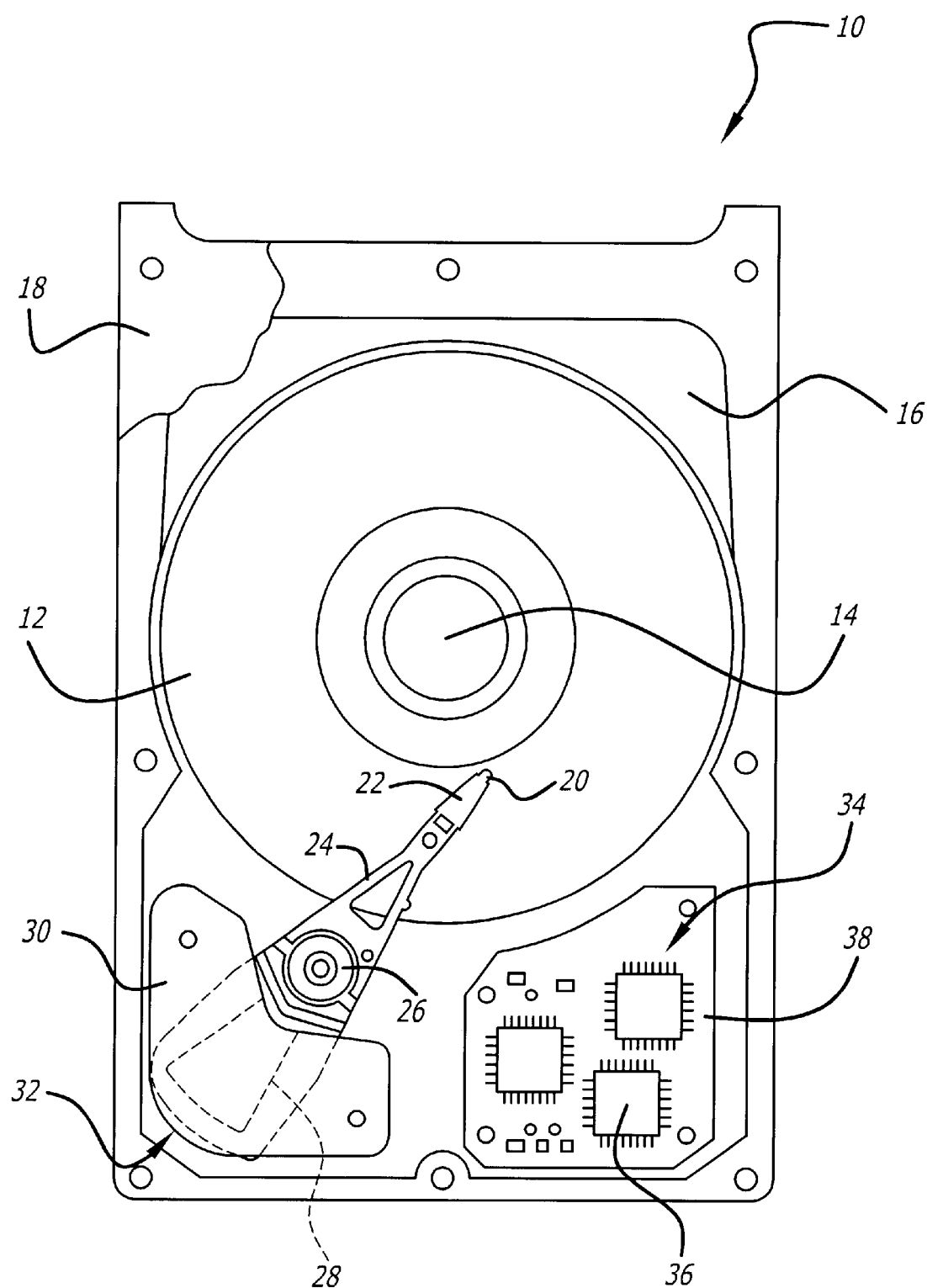
FIG. 1 is a top view of an embodiment of a hard disk drive of the present invention.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

The hard disk drive 10 may include a printed circuit board assembly 34 that includes a plurality of integrated circuits 36 coupled to a printed circuit board 38. The printed circuit board 36 is coupled to the voice coil 28, heads 20 and spindle motor 14 by wires (not shown).

Figure 2:
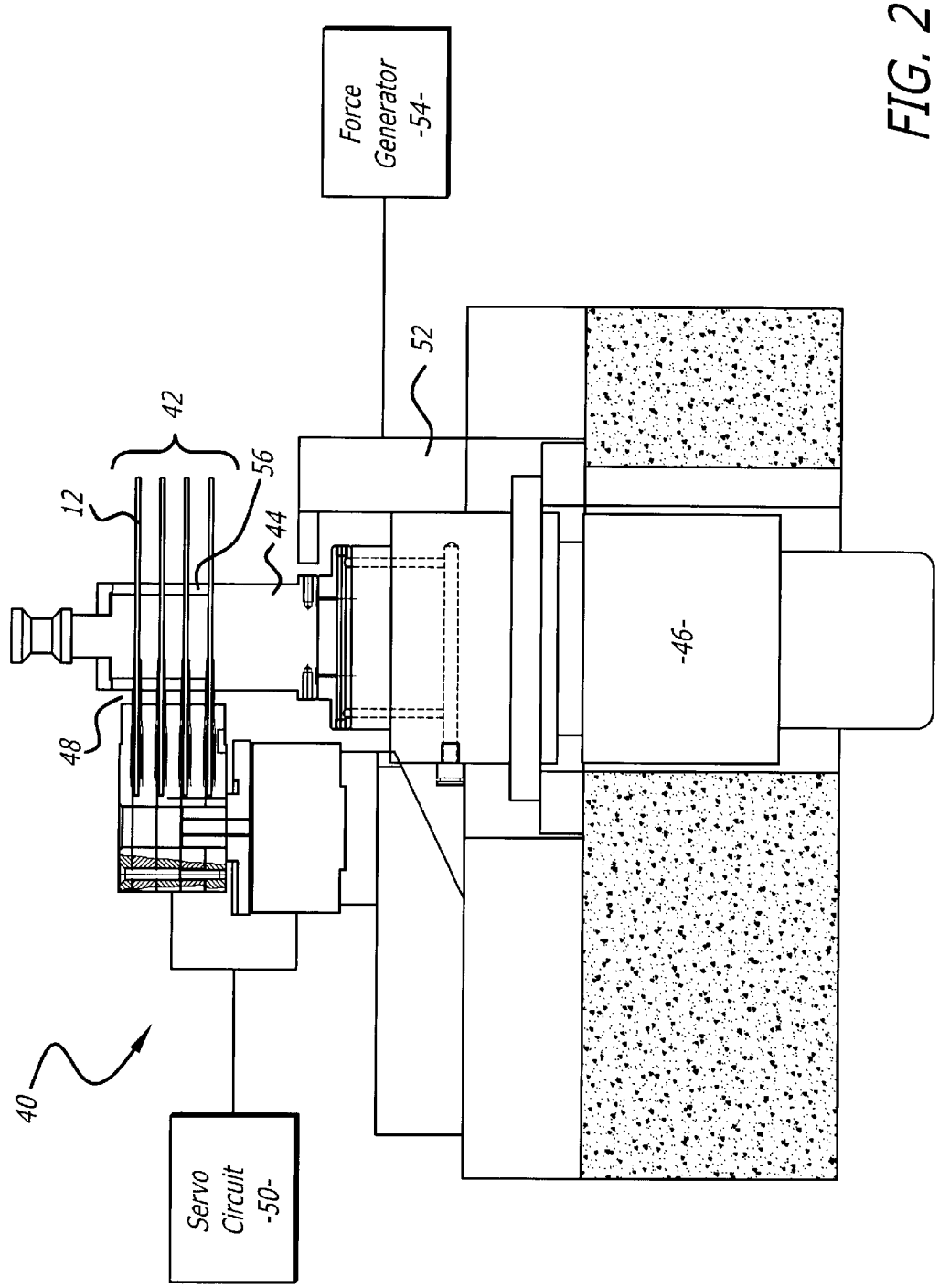
FIG. 2 is a side sectional view of a servo writer.

FIG. 2 shows a servo writer 40 that can write servo information onto the disks 12 of a disk stack assembly 42. The disks 12 are stacked onto a chuck 44 that is coupled to a spindle motor 46. The spindle motor 46 rotates the disks 12. The servo writer 40 contains a plurality of heads 48 that are magnetically coupled to the disks 12. The heads 48 are driven by a servo writing circuit 50. The servo writing circuit 50 causes the heads 48 to write servo information onto the rotating disks 12.

The servo writer 40 includes a force actuator 52 that can apply a force to the chuck 44. The actuator 52 preferably applies a radial force to the stack assembly 42. The force actuator 52 may be coupled to a force generator 54 which contain logic and driving circuits to drive the actuator 52.

By way of example, the generator 54 may drive the actuator 52 to apply a series of impulse forces. For example, each impulse force may apply a shock of 20 to 25 G's having a 11 millisecond half sinewave duration. Alternatively, the generator 54 may provide a plurality of randomly generated output signals to drive the actuator 52. By way of example, the output signal may have a power spectrum density of 0.008 g2/Hz (maximum) for a period of 10 to 20 seconds.

In operation, the disks 12 are stacked onto the chuck 44 and the chuck 44 is attached to the spindle motor 46. The disk stack 42 may include spacers 56 that are assembled onto the chuck 44 and separate the disks 12. A torque may be applied to the disk stack assembly 42 to press the disks 12 onto the chuck. The torque is less than the operating torque normally applied to assemble the stack 42. By way of example, the torque may be approximately 5% of the operating torque. The torque level should secure the disk stack 42 while allowing the disks 12 to move relative to the chuck 44.

The spindle motor 46 then rotates the disks 12 and the force actuator 52 applies forces to the chuck 44. The disk stack 42 is preferably rotated at a speed less than the normal operating speed of the disks 12. By way of example, the disks 12 may be rotated at a speed approximately 25% to 30% of the normal speed. The combination of spinning the disk stack 42 and applying forces to the chuck 44 causes the disks 12 to self-center within the assembly 42.

The disks 12 are spun down to a rest position. The full operating torque is then applied to the disk stack 42 to secure the disks 12. The disk stack 42 is again rotated and the servo information is written onto the disks 12 with the heads 48 and servo circuit 50.

After the servo information is written onto the disks 12 the disk stack 42 is spun down and the chuck 44 is detached from the spindle motor 44. The disks 12 are then removed from the chuck 44 for assembly into a hard disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for assembling a disk stack assembly for a hard disk drive, comprising:

applying an initial torque to a disk stack assembly;

rotating the disk stack assembly;

applying a plurality of randomly generated forces to the disk stack assembly;

spinning down the disk stack assembly; and, applying an operating torque to the disk stack assembly.

2. The method of claim 1, further including writing servo information onto a disk of the disk stack assembly.

3. The method of claim 1, wherein the torque is less than an operating torque.

4. The method of claim 3, wherein the initial torque is approximately 5 percent of the operating torque.

5. The method of claim 1, wherein the disk stack assembly is rotated at a speed that is less than an operating speed.

6. The method of claim 5, wherein the disk is rotated at a speed that is between 25 to 30 percent of the operating speed.

7. The method of claim 1, wherein the force is applied in a radial direction of a disk in the disk stack assembly.

8. A servo writer, comprising:

a spindle motor;

a chuck coupled to said spindle motor;

a servo writing head;

a servo writing circuit coupled to said servo writing head; and, a force actuator coupled said chuck and that applies a plurality of randomly generated forces to said chuck.

9. The servo writer of claim 10, wherein said force actuator applies a radial force to said chuck.

10. The servo writer of claim 8, wherein said spindle motor rotates at a speed that is less than an operating speed.

11. The servo writer of claim 8, further comprising a force generator that drives said force actuator.

12. A servo writer for writing servo information onto a disk stack assembly, comprising:

spindle means for rotating the disk stack assembly;

servo means for writing servo information onto a disk of the disk stack assembly; and, force means for applying a plurality of randomly generated forces to the disk stack assembly.

13. The servo writer of claim 12, wherein said force means applies a radial force.

14. The servo writer of claim 12, wherein said spindle means rotates the disk stack assembly at a speed that is less than an operating speed.

15. The servo writer of claim 12, wherein said force means includes a force generator that drives a force actuator.

16. A method for writing servo information onto a disk of a disk stack assembly, comprising:

coupling a disk stack assembly to a spindle motor;

applying an initial torque to a disk stack assembly;

rotating the disk stack assembly;

applying a plurality of randomly generated forces to the disk stack assembly;

spinning down the disk stack assembly;

applying an operating torque to the disk stack assembly that is greater than the initial torque;

rotating the disk stack assembly;

writing servo information onto a disk of the disk stack assembly;

spinning down the disk stack assembly; and, decoupling the disk stack assembly from the spindle motor.

17. The method of claim 16, wherein the initial torque is approximately 5 percent of the operating torque.

18. The method of claim 16, wherein the disk stack assembly is initially rotated at a speed that is less than an operating speed.

19. The method of claim 18, wherein the speed is between 25 to 30 percent of the operating speed.

20. The method of claim 16, wherein the force is applied in a radial direction.

* * * * *